United States Patent
Perets et al.

(10) Patent No.: US 9,871,607 B1
(45) Date of Patent: Jan. 16, 2018

(54) PHASE CONTINUITY IN NARROW-BAND TRANSMISSION WITHIN A FREQUENCY-DOMAIN MULTIPLE-ACCESS COMMUNICATION SYSTEM

(71) Applicant: Marvell International Ltd., Hamilton (BM)

(72) Inventors: Yona Perets, Raanana (IL); Ezer Melzer, Tel Aviv (IL); Shimon Moshavi, Bet Shemesh (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 15/220,406

(22) Filed: Jul. 27, 2016

Related U.S. Application Data

(60) Provisional application No. 62/197,738, filed on Jul. 28, 2015.

(51) Int. Cl.
  *H04L 27/26* (2006.01)
  *H04J 1/04* (2006.01)
  *H04L 5/00* (2006.01)

(52) U.S. Cl.
  CPC .......... *H04J 1/045* (2013.01); *H04L 5/0007* (2013.01); *H04L 27/2626* (2013.01); *H04L 27/2628* (2013.01)

(58) Field of Classification Search
  CPC ............. H04L 27/2626; H04L 27/2601; H04L 27/2647
  USPC .................................................. 375/259, 260
  See application file for complete search history.

(56) References Cited

U.S. PATENT DOCUMENTS

| | | | |
|---|---|---|---|
| 2004/0067741 A1* | 4/2004 | Fei ....................... | H04L 27/2657 455/192.1 |
| 2010/0074349 A1* | 3/2010 | Hyllander ........... | H04L 27/2647 375/260 |
| 2015/0071105 A1* | 3/2015 | Farhang ............ | H04L 25/03159 370/252 |
| 2016/0226639 A1* | 8/2016 | Xiong ................... | H04L 5/0053 |

OTHER PUBLICATIONS

3GPP TS 36.211., "3rd Generation Partnership Project;Technical Specification Group Radio Access Network; volved Universal Terrestrial Radio Access (E-UTRA);Physical channels and modulation", Release 13, version 13.1.0, 155 pages, Mar. 2016.

\* cited by examiner

*Primary Examiner* — Kevin M Burd

(57) ABSTRACT

A method for communication includes, in a transmitter, generating a signal for transmission to a receiver over a frequency sub-band assigned within a predefined system bandwidth, using a selected transmitter carrier frequency. The signal is converted into a phase-compensated signal by applying to the signal, using a phase compensator in the transmitter, a phase compensation that compensates for phase discontinuities caused to the signal due to a frequency difference between the transmitter carrier frequency and a center frequency, which is used by the receiver for down-converting the predefined system bandwidth. The phase compensation depends on the frequency difference. The phase-compensated signal is transmitted to the receiver over the frequency sub-band, using a transmitter front-end module.

14 Claims, 3 Drawing Sheets

US 9,871,607 B1

PHASE CONTINUITY IN NARROW-BAND TRANSMISSION WITHIN A FREQUENCY-DOMAIN MULTIPLE-ACCESS COMMUNICATION SYSTEM

CROSS-REFERENCE TO RELATED APPLICATIONS

This application claims the benefit of U.S. Provisional Patent Application 62/197,738, filed Jul. 28, 2015, whose disclosure is incorporated herein by reference.

FIELD OF THE DISCLOSURE

The present disclosure relates generally to communication systems, and particularly to methods and systems for maintaining phase continuity in narrow-band communication.

BACKGROUND

Various communication systems support simultaneous access to a communication channel by multiple users. For example, Orthogonal Frequency-Division Multiple Access (OFDMA) is a multi-user access scheme in which each individual user is assigned a small portion of the system bandwidth at a given time interval. OFDMA can be used in a variety of applications such as, for example, machine-to-machine (M2M) communications, providing connectivity among devices in an Internet of Things (IoT) network, and the like.

An example technology supporting OFDMA is the 3GPP Long Term Evolution (LTE)—Machine Type Communications (MTC), including enhanced-MTC (eMTC) and Narrow-Band IoT (NB-IoT). LTE-MTC is being developed as part of the 3GPP Release-13, which is specified, for example, in a Technical Specification entitled "LTE; Evolved Universal Terrestrial Radio Access (E-UTRA); Physical channels and modulation," 3GPP TS 36.211, version 13.1.0, Release 13, April, 2016, which is incorporated herein by reference. An important goal in the 3GPP Release-13 specifications was to develop a low-complexity/low-cost mobile terminal that operates at a reduced bandwidth compared to legacy mobile terminals, yet being served (together with other mobile terminals) by a network which operates at a wider bandwidth.

The description above is presented as a general overview of related art in this field and should not be construed as an admission that any of the information it contains constitutes prior art against the present patent application.

SUMMARY

An embodiment that is described herein provides a method for communication including, in a transmitter, generating a signal for transmission to a receiver over a frequency sub-band assigned within a predefined system bandwidth, using a selected transmitter carrier frequency. The signal is converted into a phase-compensated signal by applying to the signal, using a phase compensator in the transmitter, a phase compensation that compensates for phase discontinuities caused to the signal due to a frequency difference between the transmitter carrier frequency and a center frequency, which is used by the receiver for down-converting the predefined system bandwidth. The phase compensation depends on the frequency difference. The phase-compensated signal is transmitted to the receiver over the frequency sub-band, using a transmitter front-end module.

In some embodiments, generating the signal includes generating multiple Orthogonal Frequency-Division Multiplexing (OFDM) sub-carriers in a given symbol time interval, and applying the phase compensation includes applying a same phase shift to all the OFDM sub-carriers in the given symbol time interval. In other embodiments, applying the phase shift includes calculating the same phase shift depending on a duration of a cyclic prefix attached to the OFDM symbol. In yet other embodiments, a difference between the transmitter carrier frequency and the center frequency is a non-integer multiple of a frequency difference between adjacent OFDM sub-carriers.

In an embodiment, generating the OFDM sub-carriers includes generating a partial subset of an overall set of OFDM sub-carriers specified for the predefined system bandwidth. In another embodiment, generating the signal includes converting a frequency-domain baseband representation of the signal to a time-domain baseband representation of the signal using an Inverse Fast Fourier transform (IFFT), and up-converting the time-domain baseband representation of the signal for transmission at the selected transmitter carrier frequency.

In some embodiments, applying the phase compensation includes applying the phase compensation to the frequency-domain baseband representation of the signal. In other embodiments, applying the phase compensation includes applying the phase compensation to the time-domain representation of the baseband signal. In yet other embodiments, the method further includes receiving in the transmitter signaling from the receiver that indicates the center frequency, and applying the phase compensation includes calculating the phase compensation based on the indicated center frequency.

There is additionally provided, in accordance with an embodiment that is described herein, a communication apparatus processing that includes circuitry and a transmitter front-end module. The processing circuitry is configured to generate a signal for transmission to a receiver over a frequency sub-band assigned within a predefined system bandwidth, using a selected transmitter carrier frequency, and to convert the signal into a phase-compensated signal by applying to the signal a phase compensation that compensates for phase discontinuities caused to the signal due to a frequency difference between the transmitter carrier frequency and a center frequency of a predefined system bandwidth, which is used by the receiver for down-converting the predefined system bandwidth. The phase compensation depends on the frequency difference. The transmitter front-end module is configured to transmit the phase-compensated signal to the receiver over the frequency sub-band.

The present disclosure will be more fully understood from the following detailed description of the embodiments thereof, taken together with the drawings in which:

DETAILED DESCRIPTION OF EMBODIMENTS

Figure 1:
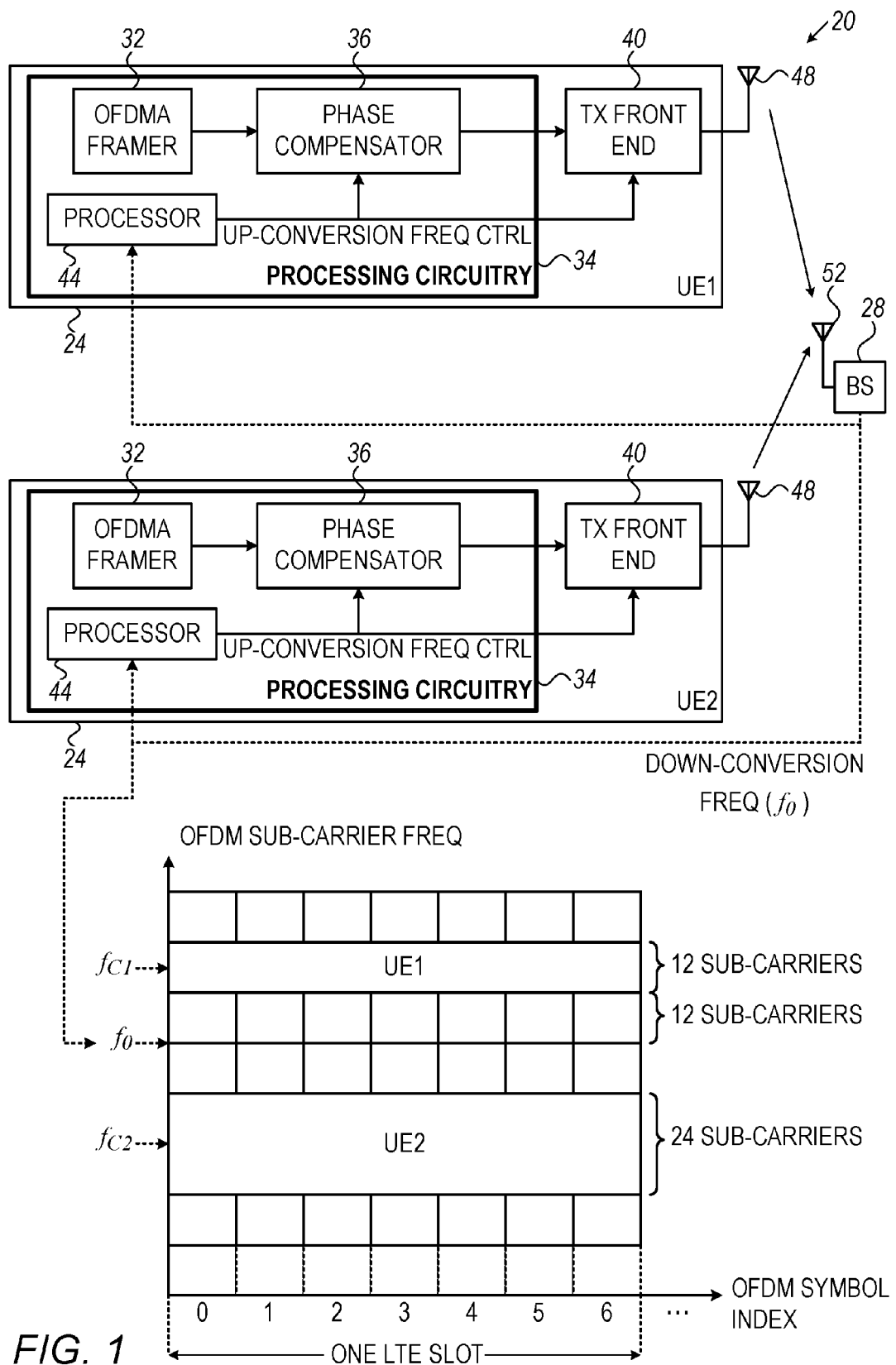
FIG. 1 is a block diagram that schematically illustrates mobile communication terminals operating in a wireless communication system, and time-frequency resource elements allocated to these terminals, in accordance with an embodiment that is described herein.

Embodiments that are described herein provide improved methods and systems for maintaining phase continuity in Frequency Division Multiple Access (FDMA) communication systems. In such systems, multiple users gain (or are granted) access to sub-bands of the system bandwidth occupied by the entire network. In order to reduce the complexity and cost of the user terminals, it is sometimes beneficial to limit their capabilities, so that the reduced-complexity terminals support operation in a relatively narrow bandwidth compared to the full system bandwidth. To avoid compromising the network capacity, however, such terminals are required to be able to operate on a narrow band that is not necessarily centered on the center frequency of the full system bandwidth. As a result, these terminals typically operate using up-conversion and down-conversion frequencies that are shifted relative to the carrier frequency of the network (which is the natural frequency used for up-conversion and down-conversion by the base stations of the network).

For example, the OFDMA scheme in LTE-MTC (as well as other OFDMA based systems) supports a frequency scheduling operating mode, in which a set of sub-carriers is allocated dynamically (or semi-statically) per user for transmission within a certain time interval, which typically spans several consecutive OFDM symbols. When the user's transmitter operates at an up-conversion frequency, which is different from the carrier frequency of the network, phase discontinuities are typically undesirably introduced between OFDM symbols at the receiver, after the received signal is down-converted to baseband as part of the demodulation process. Conventionally, such phase discontinuities must be handled at the receiver on a per-user basis, in order to enable the receiver to successfully detect data transmitted from all the users.

In the disclosed techniques, on the other hand, compensation for the phase discontinuity introduced by the shifted carrier frequency is carried out by the transmitter. Performing this task by the transmitter instead of by the receiver is useful, for example, in a receiver that receives multiple up-converted transmissions with respective frequency-shifted carriers from multiple transmitters simultaneously, such as a receiver of a cellular base station.

Such a receiver is relieved of the need to track and compensate for the different phase discontinuities of the different frequency-shifted transmissions. Moreover, the receiver is able to handle both transmitters that employ a shifted up-conversion frequency such as LTE-MTC mobile devices and transmitters that employ the system carrier frequency as their up-conversion frequency such as legacy mobile devices, at the same complexity of a receiver designed for handling only legacy transmitters.

Data symbols in OFDMA transmissions, including DFT-spread OFDMA (also referred to as Single-Carrier FDMA), are modulated over multiple sub-carriers of an OFDM symbol. For example, in LTE-MTC (specified, for example, in the 3GPP TS 36.211 specification cited above) the signal transmitted during the time interval of the $l^{th}$ OFDM symbol is given as a superposition of the sub-carriers assigned to the transmitter:

$$S_l(t) = \text{Re}\left\{ \sum_{k=Kmin}^{Kmax} a_{k^{(-)},l} \cdot e^{j2\pi(k+\lambda)\cdot \Delta f \cdot (t-T_l+N\cdot T_S)} \cdot e^{j2\pi(f_0+\Delta K\cdot \Delta f)t} \right\} \quad \text{Equation 1}$$

wherein $T_l$ is given by:

$$T_l = \sum_{m=0}^{l}(N + N_{CP,m})\cdot T_S \quad \text{Equation 2}$$

and the time variable t for the $l^{th}$ OFDM symbol is given by:

$$\begin{cases} 0 \leq t < T_{l=0} & l = 0 \\ T_{l-1} \leq t < T_l & l > 0 \end{cases} \quad \text{Equation 3}$$

Further in Equation 1:
The indices k and l define the respective frequency and time indices of the OFDM resource element.
$\Delta f$ is the frequency spacing between adjacent sub-carriers.
$\Delta K$ defines a transmitter-specific frequency shift (relative to the carrier frequency $f_0$) in units of $\Delta f$, i.e., the frequency shift is $\Delta K \cdot \Delta f$.
The summation is performed over integer sub-carrier indices k ranging between $Kmin = -[N_{SC}/2]$ and $Kmax = [(N_{SC}-1)/2]$, wherein $N_{SC}$ is the total number of sub-carriers comprising the transmitted signal.
$a_{k^{(-)},l}$ is the complex value associated with the resource element $(k^{(-)},l)$, and $k^{(-)}=k-Kmin$.
N is the duration of the OFDM symbol, excluding the cyclic prefix (CP), and $N_{CP,l}$ is the duration of the CP part of the $l^{th}$ OFDM symbol; the time duration is defined in units of $T_S$, wherein $T_S=1/(N\cdot \Delta f)$.
$\lambda$ is a parameter that may differ between uplink and downlink transmissions. In LTE, for example, $\lambda=0$ for downlink transmission and $\lambda=1/2$ for uplink transmissions.

In some LTE configurations, $\Delta f=15$ KHz, $N=2048$ and the possible values of $N_{CP,l}$ are given, for example, in Table 6.12-1 of the 3GPP TS 36.211 specification cited above.

As seen in Equation 1, the baseband OFDM symbol is up-converted using a carrier frequency $f_0+\Delta K\cdot \Delta f$, wherein $\Delta K\cdot \Delta f$ is the carrier frequency shift relative to $f_0$ throughout a given transmission burst of L, e.g., consecutive OFDM symbols (namely, $l=0, 1, \ldots, L-1$) for which $\Delta K$ remains fixed. Both $\Delta K$ and L are typically known to both the transmitter and receiver.

Consider a receiver that down-converts the signal $S_l(t)$ of Equation 1 using a down-conversion oscillator whose frequency is the system bandwidth center frequency $f_0$, i.e., the front-end processing of this receiver ignores the frequency shift $\Delta K\cdot \Delta f$ added to $f_0$ at the transmitter. Assuming an ideal communication channel that introduces no distortions or noise to the transmitted signal, the baseband signal at the receiver is given as:

$$Y_l(t) = \sum_{k=Kmin}^{Kmax} a_{k^{(-)},l} \cdot e^{j2\pi(k+\lambda)\cdot \Delta f\cdot (t-T_l+N\cdot T_S)} \cdot e^{j2\pi(\Delta K\cdot \Delta f)t} \quad \text{Equation 4}$$

As seen in Equation 4, the baseband signal at the receiver has a residual unresolved phase component given by:

$$e^{j2\pi(\Delta K \cdot \Delta f) \cdot t}$$ Equation 5:

The first step in processing the baseband signal at the receiver involves windowing, namely removing the Cyclic Prefix (CP) part of duration $N_{CP,l} \cdot T_S$ from each OFDM symbol, so that a signal of duration $N \cdot T_S$ remains for further processing of the OFDM symbol. Once the CP of each received OFDM symbol is removed, the residual phase component in Equation 5 causes a phase discontinuity of $2\pi \cdot (\Delta K \cdot \Delta f) \cdot N_{CP,l} \cdot T_S$ radians between the neighboring $(l-1)^{th}$ and $l^{th}$ OFDM symbols at the receiver.

Demodulation of OFDM symbols at the receiver is typically carried out by applying a Fast Fourier Transform (FFT) to the baseband OFDM symbol after windowing (i.e., CP removal) as described above. In principle, the receiver could resolve the residual phase component of Equation 5 by multiplying the received OFDM symbol (prior to windowing) by the complex conjugate of the expression in Equation 5, and then apply the windowing and FFT operations to the compensated signal. Note, however, that the OFDM symbol at the receiver typically carries transmissions from multiple transmitters, each having a different carrier frequency shift. Such a receiver would therefore have to perform phase compensation followed by windowing and FFT for each of the simultaneously received transmissions. Since FFT is a computationally-intensive operation, applying a separate FFT operation per each transmitter is prohibitive.

The received signal of Equation 4 can be shown to be described equivalently as:

$$Y_l(t) = \left[ \sum_{\hat{k}=Kmin+\Delta K}^{Kmax+\Delta K} a_{\hat{k}^{(-)},l} \cdot e^{j2\pi(\hat{k}+\lambda)\Delta f \cdot (t - T_l + N \cdot T_S)} \right] \cdot \Omega_{l,\Delta K}$$ Equation 6 wherein $\hat{k}^{(-)} = \hat{k} - Kmin - \Delta K$, and the overall phase factor $\Omega_{l,\Delta K}$ is given by:

$$\Omega_{l,\Delta K} = e^{j2\pi(\Delta K \cdot \Delta f) \cdot (T_l - N \cdot T_S)}$$ Equation 7:

or equivalently by:

$$\Omega_{l,\Delta K} = \exp\left[ j2\pi \cdot \Delta K \cdot \left( \sum_{m=0}^{l} N_{CP,m} \right) / N \right]$$ Equation 8

Note that in the expression of Equation 6, $\Delta K$ affects the actual range of sub-carriers summed for each transmitter separately.

As will be described in detail below, in the disclosed embodiments, the transmitter applies a common phase shift $\Omega_{l,\Delta K}$ to the data carried by all the sub-carriers used in each OFDM symbol, or alternatively to the time samples of the resulting OFDM symbol. The phase shift applied at the transmitter compensates for the carrier shift frequency relative to the down-conversion frequency at the receiver.

FIG. 1 is a block diagram that schematically illustrates mobile communication terminals 24 operating in a wireless communication system 20, and time-frequency resource elements allocated for these terminals, in accordance with an embodiment that is described herein. In LTE and LTE-Advanced (LTE-A), mobile terminal 24 is also referred to as UE, and the two terms are used interchangeably herein. In system 20, UEs 24 transmit uplink signals to a base station (BS) 28, and receive downlink signals from the BS. Depending on the applicable standard, BS 28 is also referred to as a cell, NodeB or eNodeB, or an Access Point, or "the network."

In the present example, system 20 is an LTE communication system supporting LTE-MTC communications as specified, for example, in the 3GPP standard TS 36.211 cited above. Alternatively, system 20 supports any other suitable type of low data rate multiple-access communications, e.g., in accordance with any suitable standard.

System 20 employs an OFDMA multiple-access scheme. BS 28 has a wideband receiver that may receive narrowband (NB) uplink signals from multiple UEs simultaneously. In OFDMA, the signal transmitted by different UEs are separated by allocating to the UEs different NB sub-bands of the overall system bandwidth in the OFDM symbol.

The transmitter part of UE 24 comprises processing circuitry 34, which comprises an OFDMA framer 32, a phase compensator 36 and a processor 44. UE 24 additionally comprises a TX Front End (FE) 40. Processor 44 carries out various management and control tasks for the UE. OFDMA framer 32 modulates data symbols to be transmitted over sub-carriers of OFDM symbols. At the UE, the OFDM symbol comprises a superposition of one or more sub-carriers allocated for that UE. In system 20, when a given UE requires an uplink bandwidth that spans multiple sub-carriers, the BS allocates for this UE multiple consecutive sub-carriers within the overall system bandwidth. For example, an LTE system may support a total bandwidth of 20 MHz, of which a LTE-MTC UE is assigned a bandwidth of 1.08 MHz or less.

In some embodiments, system 20 employs frequency scheduling resulting in sub-carrier allocations, which do not overlap with the center frequency of the uplink system bandwidth, thus requiring the processing circuitry 34 to tune the up-conversion frequency of TX FE 40 to a frequency different from the center frequency of the uplink system bandwidth, which may introduce phase discontinuity at the BS receiver, as explained above. Phase compensator 36 accepts an OFDM symbol from OFDMA framer 32 and applies to the sub-carriers assigned to the UE in this OFDM symbol a phase shift that compensates for the respective carrier frequency shift. TX FE 40 up-converts the phase compensated OFDM symbols to a shifted carrier frequency, and transmits the up-converted signal via transmit antenna 48.

BS 28 receives uplink signals from multiple UEs such as UE1 and UE2 via receive antenna 52. The BS assigns to each UE a different respective subset of sub-carrier frequencies so that different UEs use non-overlapping subsets of sub-carriers within the wideband OFDM symbol seen at the receiver. As will be described in detail below, the UEs are aware of the down-conversion frequency $f_0$ used at the BS receiver, and apply a phase compensation (using phase compensator 36) that takes into consideration the carrier frequency shift at the UE relative to $f_0$. As a result, phase continuity between successive OFDM symbols is maintained at the receiver for each of the received UEs.

The lower part of FIG. 1 depicts scheduling of narrowband sub-bands for two (e)MTC UEs (denoted UE1 and UE2) over seven consecutive OFDM symbols of a LTE slot. The frequency allocation for (e)MTC terminals is carried out at a granularity of Physical Resource Blocks (PRB), i.e., in multiples of twelve sub-carriers. In the present example UE1 and UE2 are assigned one and two PRBs, respectively. In the present example, the carrier frequencies of UE1 and UE2 are denoted $f_{C1}$ and $f_{C2}$, respectively. Both carrier frequencies (which in general may lie outside the respective PRB frequency allocations, and may also be equal even though the allocated sub-carrier sets are non-overlapping) are shifted relative to the center frequency $f_0$, and therefore introduce phase discontinuities.

The scheduling scheme in FIG. 1 is given by way of example, and other scheduling schemes with other suitable time and/or frequency granularities can also be used. For example, LTE NB-IoT also supports multi-tone allocations of 1, 3 and 6 sub-carriers within a narrowband comprising a single PRB.

Figure 2:
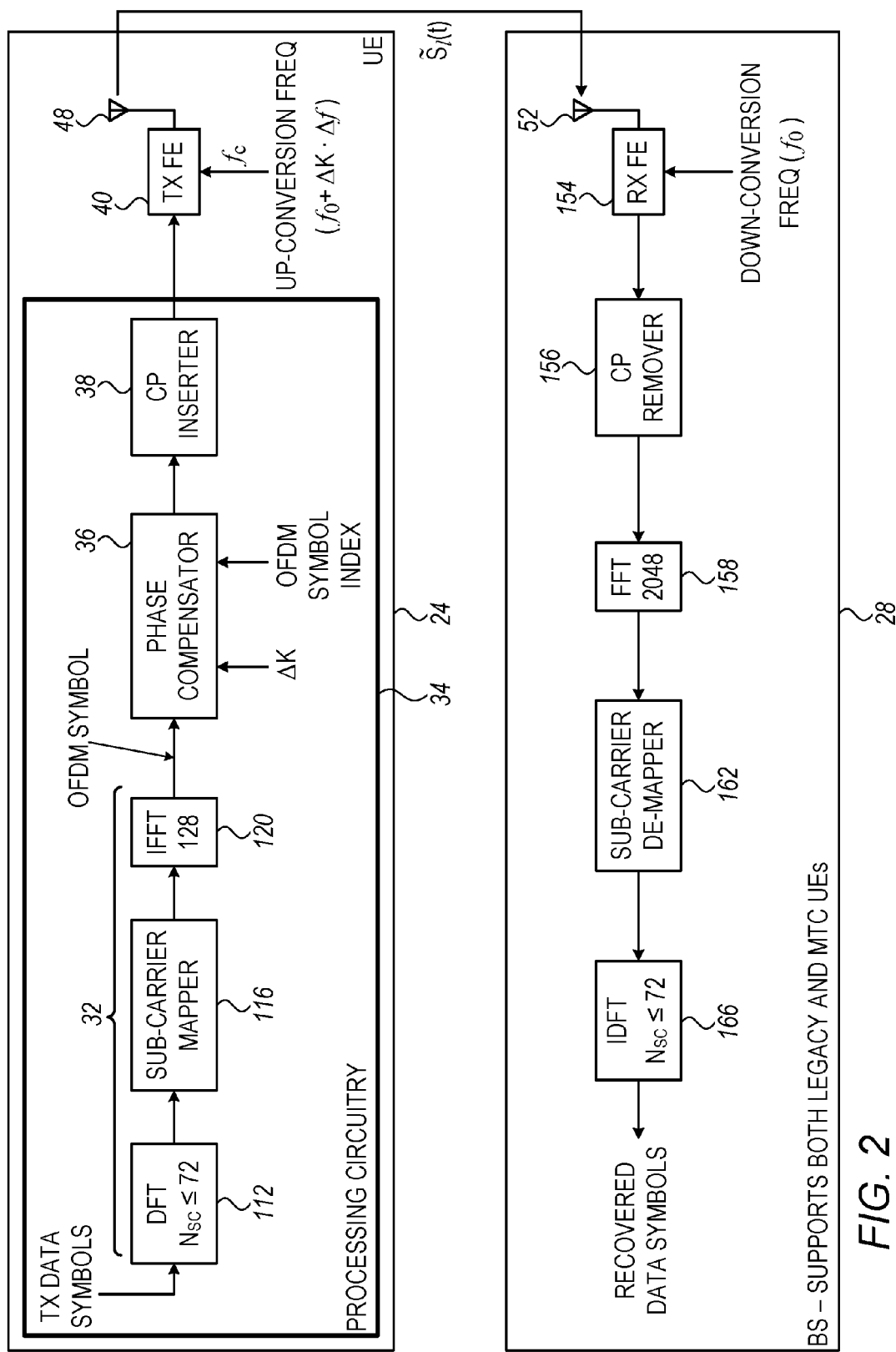
FIG. 2 is a block diagram that schematically illustrates a detailed structure of some of the elements of a mobile terminal and of a base station, in accordance with an embodiment that is described herein.

FIG. 2 is a block diagram that schematically illustrates a detailed structure of some of the elements of mobile terminal 24 and of base station 28, in accordance with an embodiment that is described herein. In the present example, UE 24 and BS 28 are operating in accordance with the LTE-MTC specifications.

As seen also in FIG. 1, processing circuitry 34 of UE 24 comprises OFDMA framer 32 and phase compensator 36. OFDMA framer 32 comprises a Discrete Fourier Transform (DFT) module 112, a sub-carrier mapper 116 and an Inverse FFT (IFFT) module 120. DFT module 112 spreads $N_{SC}$ data symbols over $N_{SC}$ sub-carrier frequencies. In LTE, the sub-band allocated to the UE is limited to $N_{SC} \leq 72$ sub-carriers (in integer multiples of 12). The data symbols typically comprise Quadrature Amplitude Modulation (QAM) modulated symbols, although other suitable modulation schemes can also be used. Sub-carrier mapper 116 maps the $N_{SC}$ complex-valued symbols generated by the DFT module to $N_{SC}$ contiguous sub-carriers selected among a higher number (e.g., 128) of available sub-carriers. IFFT module 120 transforms the 128 modulated sub-carriers into a baseband OFDM symbol in the time domain. The $l^{th}$ baseband OFDM symbol can be expressed as:

$$SB_l(t) = \sum_{k=Kmin}^{Kmax} a_{k(-),l} \cdot e^{j2\pi(k+\lambda)\Delta f \cdot (t - T_l + N \cdot T_S)}, \quad \text{Equation 9}$$

wherein Kmax−Kmin+1=$N_{SC}$.

In some embodiments, phase compensator 36 applies to the signal $SB_l(t)$ phase compensation. In an alternative transmitter embodiment, the phase compensation is performed before IFFT 128 or even before DFT 112, still leading to the same output of processing circuitry 34. A CP inserter module 38 adds a cyclic prefix to each OFDM symbol, and TX FE 40 up-converts the phase compensated signal using a carrier frequency denoted $f_c$. The transmitted signal of the $l^{th}$ ODFM symbol is given by:

$$\tilde{S}_l(t) = \text{Re}\left\{ \left[ \sum_{k=Kmin}^{Kmax} a_{k(-),l} \cdot e^{j2\pi(k+\lambda)\Delta f \cdot (t-T_l+N \cdot T_S)} \right] \cdot \Omega^*_{l,\Delta K} \cdot e^{j2\pi f_c \cdot t} \right\} \quad \text{Equation 10}$$

wherein the carrier $f_c$ is given as a frequency shift ($\Delta K \cdot \Delta f$) relative to the uplink center frequency $f_0$:

$$f_c = f_0 + \Delta K \cdot \Delta f \quad \text{Equation 11:}$$

In Equation 10, the phase correction term $\Omega_{l,\Delta K}$ is given by:

$$\Omega^*_{l,\Delta K} = \exp\left[ -j2\pi \cdot \Delta K \cdot \left( \sum_{m=0}^{l} N_{CP,m} \right) / N \right] \quad \text{Equation 12}$$

Note that given the carrier frequency $f_c$, and assuming $f_0$ is known, the UE can use Equation 11 to extract $\Delta K$ for calculating the phase compensation (or phase correction) term as given in Equation 12.

The receiver part of BS 28 comprises an RX FE module 154 that receives the signal transmitted by UE 24, as given by Equation 10 above, and down-converts this signal using a down-conversion oscillator signal whose frequency is $f_0$.

The receiver of BS 28 comprises a CP remover module 156 followed by an FFT module 158 for converting the baseband OFDM symbol at the RX FE output to the frequency domain. Typically, the receiver supports a bandwidth not narrower than each of the individual UEs and therefore FFT 158 is typically larger than IFFT 120 of the UE. In the present example FFT module 158 comprises 2048 sub-carriers. A sub-carrier de-mapper 162 maps the $N_{SC}$ modulated sub-carriers back to $N_{SC}$ complex-valued symbols, and an Inverse DFT (IDFT) module 166 applies to these complex-valued symbols an inverse DFT transform to recover the transmitted data symbols.

In some practical implementations, a frequency-domain equalization step, based on channel and noise estimation, is typically performed along the signal processing chain between FFT 158 and de-mapper 162. The modules for applying such processing are omitted from FIG. 2 for the sake of clarity.

In some embodiments, some or all of the elements of UE 24, BS 28, or both, are implemented in hardware, such as using one or more Radio Frequency Integrated Circuits (RFICs), Field-Programmable Gate Arrays (FPGAs) or Application-Specific Integrated Circuits (ASICs). In an alternative embodiment, certain UE and/or BS elements, such as certain elements of processing circuitry 34, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The UE, processing circuitry and BS configurations seen in FIGS. 1 and 2 are example configurations, which are depicted solely for the sake of clarity. In alternative embodiments, any other suitable UE, processing circuitry and BS configurations can be used. UE, processing circuitry and BS elements that are not mandatory for understanding of the disclosed techniques have been omitted from the figure for the sake of clarity.

Figure 3:
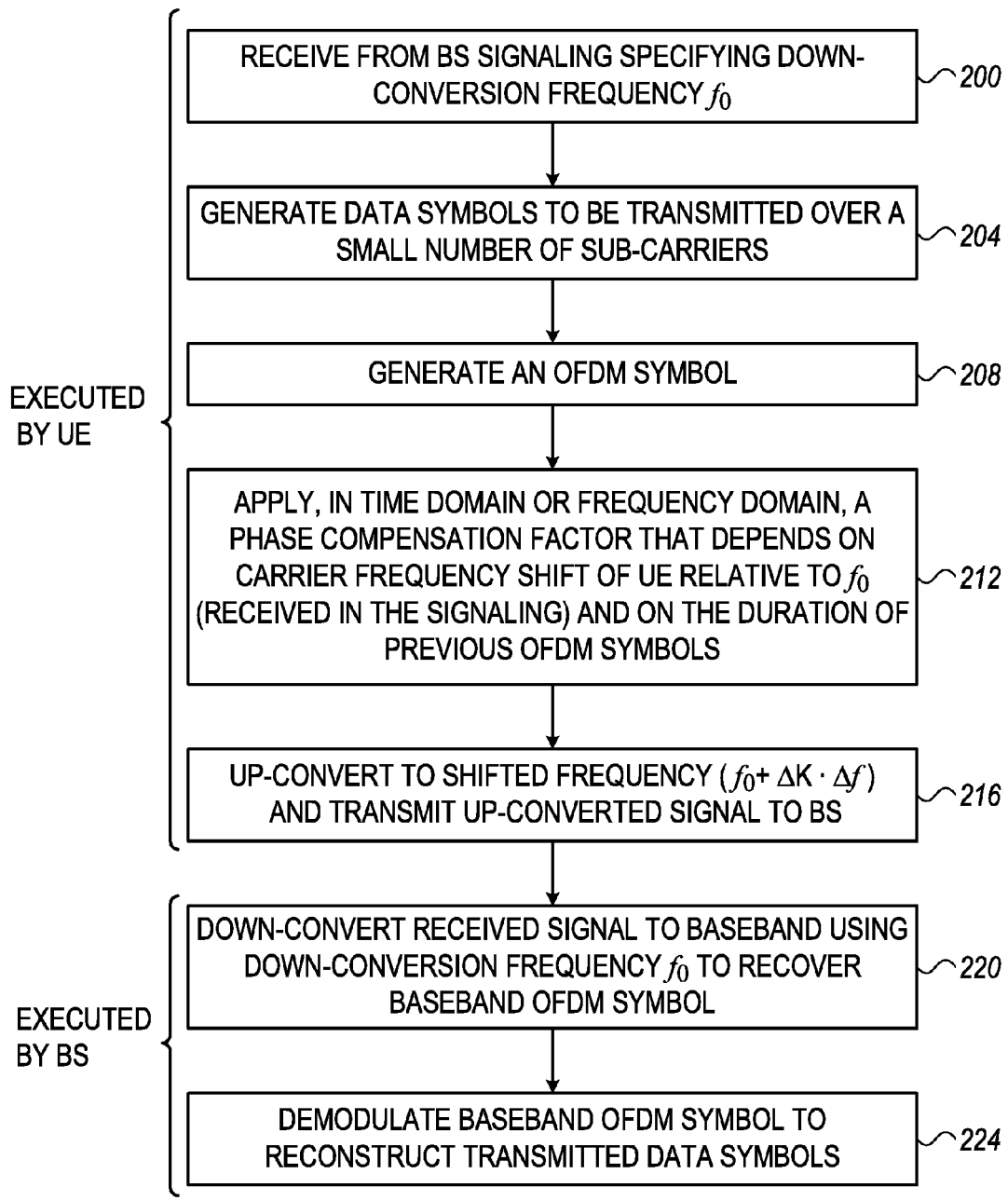
FIG. 3 is a flow chart that schematically illustrates a method for narrow-band communication in a wideband Frequency-Domain Multiple-Access (FDMA) system, in accordance with an embodiment that is described herein.

FIG. 3 is a flow chart that schematically illustrates a method for narrow-band communication in a wideband FDMA system in which phase continuity at the receiver is achieved by applying phase compensation at the transmitter, in accordance with an embodiment that is described herein. The method is described as executed by UE 24 and BS 28 of FIG. 2.

The method begins, at an initialization operation 200, with UE 24 finding out the BS's down-conversion frequency $f_0$, by receiving suitable implicit or explicit signaling from the BS. The down-conversion frequency is also referred to as a center frequency of the uplink full-system bandwidth, which is determined from the associated Absolute Radio- Frequency Channel Number (ARFCN). In alternative embodiments, the down-conversion frequency of the receiver is pre-configured in the UE, in which case operation 200 is omitted. At a data input operation 204, the UE prepares $N_{SC}$ data symbols to be transmitted over a ($N_{SC} \cdot \Delta f$) sub-band that comprises $N_{SC}$ consecutive sub-carriers having a frequency spacing $\Delta f$. In LTE (e)MTC, the number of sub-carriers assigned to the UE is bounded from above by 72, or about 1 MHz assuming $\Delta f$=15 KHz.

At an OFDM symbol generation operation 208, the transmitter modulates the data symbols over $N_{SC}$ sub-carriers of an OFDM symbol. In some embodiments, the transmitter generates the OFDM symbol using a processing chain that comprises DFT module 112, sub-carrier mapper 116 and IFFT module 120, as described above.

At a phase compensation operation 212, phase compensator 36 applies phase compensation to the OFDM symbol. In an embodiment, the phase compensator multiplies (as part of operation 208) each of the relevant resource elements of the OFDM symbols by a phase correction term $\Omega_{l,\Delta K}$ as given in Equation 12 above. At an up-conversion operation 216, CP inserter 38 adds to each OFDM symbol a cyclic prefix, and TX FE 40 up-converts the phase compensated OFDM symbol using a shifted carrier frequency $f_c = f_0 = \Delta K \cdot \Delta f$, as given in Equation 11 above to produce the up-converted signal $\tilde{S}_l(t)$ as given in Equation 10. The transmitter then transmits the signal $\tilde{S}_l(t)$ via transmit antenna 48.

At a down-conversion operation 220, the BS receives the signal $\tilde{S}_l(t)$ (after the signal has passed a communication channel and possibly superposed with similar simultaneously transmitted signals from other UEs) via receive antenna 52, and down-converts the received signal employing a down-conversion frequency $f_0$, to derive the baseband OFDM symbol. At a demodulation operation 224, the BS demodulates the OFDM symbol to reconstruct the transmitted data symbols and the method then terminates. In some embodiments, the processing chain for performing the demodulation comprises CP remover 156, FFT module 158, sub-carrier de-mapper 162 and IDFT module 166, as described above.

Note that the FFT module is wideband (2048 sub-carriers in the present example), and therefore the BS receiver can handle OFDM symbols that carry simultaneous transmissions from multiple LTE (both MTC and non-MTC) UEs. The carrier frequency used by each of the LTE-MTC UEs may have a different frequency shift relative to $f_0$, and applies respective phase compensation, which maintains phase continuity at the receiver. In addition, the same BS receiver can also handle at the same time transmissions from legacy UEs that use OFDMA with un-shifted up-conversion frequency.

In some embodiments, the UE stores in memory, e.g., at operation 200, multiple predefined phase correction values for all possible values of the symbol index, to be used for phase compensation at operation 212. In some embodiments, the phase correction term in Equation 12 is periodic in the OFDM symbol index and therefore the transmitter is required to store a relatively small number of phase correction values. In LTE, for example, summing the CP lengths $N_{CP,m}$ over a 1 ms sub-frame results in an integer multiple of N. For example, in LTE normal CP deployment, the equality $\Sigma_{m=0}^{13} N_{CP,m} = N$ holds, which implies that the equality $\Omega_{l+14,\Delta K}^* = \Omega_{l,\Delta K}^*$ holds for any integer $\Delta K$, and therefore the UE is required to store only 14 phase correction values. Similarly, in a LTE extended CP deployment $N_{CP,m}$ is the same for all m, and the equality $\Sigma_{m=j}^{j+3}$ $N_{CP,m} = 4N_{CP,m} = N$ for any integer j holds, which implies $\Omega_{l+4,\Delta K}^* = \Omega_{l,\Delta K}^*$ for any integer $\Delta K$, and in this case only 4 phase correction values are required to be stored.

In some embodiments, the carrier frequency shift, as used for example in Equations 11 and 12 above, is defined as an integer multiple of $\Delta f$ (i.e., $\Delta K$ is an integer). In alternative embodiments, the frequency shift may be expressed as a non-integer multiple of $\Delta f$, e.g., by absorbing the parameter $\lambda$ into the fractional part of $\Delta K$ in equation 6. In this case the phase correction term in Equation 12 is expressed as:

$$\Omega_{l,\Delta K}^* = \exp\left[-j2\pi \cdot (\Delta K + \lambda) \cdot \left(\sum_{m=0}^{l} N_{CP,m}\right) / N\right] \quad \text{Equation 13}$$

The embodiments described above are given by way of example, and other suitable embodiments can also be used. For example, although in the embodiments described above the UE applies phase compensation to the OFDM symbol at the time domain representation, i.e., at the input of the DFT module or at the output of the IFFT module, in alternative embodiments, the UE applies the same phase compensation at the frequency domain representation of the OFDM symbol, i.e., at the input to the IFFT module.

The embodiments described above refer mainly to narrowband transmissions of user data. The disclosed techniques, however, are also applicable for transmissions of control information and reference signals such as pilot signals that are used, for example, for channel estimation.

In the embodiments disclosed above, we mainly assume that the receiver uses the center frequency $f_0$ for down-converting the received signal directly to baseband. In alternative embodiments, the receiver performs one or more down-conversion stages to intermediate frequencies. In such embodiments, the phase compensations applied by the transmitter are still calculated using frequency shifts relative to a total equivalent down-conversion frequency, which results by accumulating the down-conversion frequencies of all the intermediate down-conversion steps.

Although the embodiments described herein mainly address LTE systems supporting MTC and enhanced MTC transmissions, the methods and systems described herein can also be used in other applications, such as in LTE NB-IoT.

In the disclosed embodiments, UEs that transmit simultaneously during a given time interval are allocated different respective narrowband sub-bands. In some embodiments, the sub-bands allocated to different UEs may partially or fully overlap. In some embodiments, the UE transmitter is assigned a random (or pseudo-random) sequence of frequencies ("frequency hopping"), which are used for up-conversion at the transmitter. The sequence of hopping frequencies is typically known to the BS, which extracts the hopping narrowband signal from the down-converted system bandwidth. In some embodiments, the UE transmitter applies phase compensations at different time intervals depending on respective differences between the frequencies in the frequency hopping sequence and the center frequency used for down-conversion at the BS receiver.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
in a transmitter, generating a signal comprising multiple Orthogonal Frequency-Division Multiplexing (OFDM) sub-carriers in a given symbol time interval, for transmission to a receiver that down-converts a predefined system bandwidth using a receiver center frequency, wherein the signal occupies a frequency sub-band assigned to the transmitter within the predefined system bandwidth and transmitted using a selected transmitter carrier frequency within the frequency sub-band;
calculating in the transmitter, based on the transmitter carrier frequency and the receiver center frequency, a phase compensation that compensates for phase discontinuities caused to the signal due to a frequency difference between the transmitter carrier frequency and the receiver center frequency, by calculating a same phase shift to all the OFDM sub-carriers in the given symbol time interval depending on a duration of a cyclic prefix attached to the OFDM symbol;
applying the calculated phase compensation to the signal by applying the same phase shift to all the OFDM sub-carriers in the given symbol time interval, in the transmitter, for producing a phase-compensated signal, using a phase compensator of the transmitter; and
transmitting, using a transmitter front-end circuitry, the phase-compensated signal over the frequency sub-band from the transmitter to the receiver.

2. The method according to claim 1, wherein the frequency difference between the transmitter carrier frequency and the receiver center frequency is a non-integer multiple of a sub-carrier frequency difference between adjacent OFDM sub-carriers.

3. The method according to claim 1, wherein generating the OFDM sub-carriers comprises generating a partial subset of an overall set of OFDM sub-carriers specified for the predefined system bandwidth.

4. The method according to claim 1, wherein generating the signal comprises converting a frequency-domain baseband representation of the signal to a time-domain baseband representation of the signal using an Inverse Fast Fourier transform (IFFT), and up-converting the time-domain baseband representation of the signal for transmission at the selected transmitter carrier frequency.

5. The method according to claim 4, wherein applying the calculated phase compensation comprises applying the calculated phase compensation to the frequency-domain baseband representation of the signal.

6. The method according to claim 5, wherein applying the calculated phase compensation comprises applying the calculated phase compensation to the time-domain representation of the baseband signal.

7. The method according to claim 1, further comprising receiving in the transmitter signaling from the receiver that indicates the receiver center frequency, and wherein calculating the phase compensation comprises calculating the phase compensation based on the indicated receiver center frequency.

8. A communication apparatus, comprising:
processing circuitry, which is configured to:
generate a signal comprising multiple Orthogonal Frequency-Division Multiplexing (OFDM) sub-carriers in a given symbol time interval, for transmission to a receiver that down-converts a predefined system bandwidth using a receiver center frequency, wherein the signal occupies a frequency sub-band assigned to the communication apparatus within the predefined system bandwidth and transmitted using a selected transmitter carrier frequency within the frequency sub-band;
calculate, based on the transmitter carrier frequency and the receiver center frequency, a phase compensation that compensates for phase discontinuities caused to the signal due to a frequency difference between the transmitter carrier frequency and the receiver center frequency, by calculating a same phase shift to all the OFDM sub-carriers in the given symbol time interval depending on a duration of a cyclic prefix attached to the OFDM symbol; and
apply the calculated phase compensation to the signal by applying the same phase shift to all the OFDM sub-carriers in the given symbol time interval, for producing a phase-compensated signal, using a phase compensator; and
a transmitter front-end circuitry, which is configured to transmit the phase-compensated signal to the receiver over the frequency sub-band.

9. The communication apparatus according to claim 8, wherein the frequency difference between the transmitter carrier frequency and the receiver center frequency is a non-integer multiple of a sub-carrier frequency difference between adjacent OFDM sub-carriers.

10. The communication apparatus according to claim 8, wherein the processing circuitry is configured to generate the OFDM sub-carriers by generating a partial subset of an overall set of OFDM sub-carriers specified for the predefined system bandwidth.

11. The communication apparatus according to claim 8, wherein the processing circuitry is configured to convert a frequency-domain baseband representation of the signal to a time-domain baseband representation of the signal using an Inverse Fast Fourier transform (IFFT), and to up-convert the time-domain baseband representation of the signal for transmission at the selected transmitter carrier frequency.

12. The method according to claim 8, wherein the processing circuitry is configured to receive signaling from the receiver that indicates the receiver center frequency, and to calculate the phase compensation based on the indicated receiver center frequency.

13. A mobile communication terminal comprising the apparatus of claim 8.

14. A chipset for processing signals in a mobile communication terminal, comprising the apparatus of claim 8.

* * * * *